United States Patent
Riazor Vilches et al.

(10) Patent No.: US 10,575,616 B2
(45) Date of Patent: Mar. 3, 2020

(54) APPARATUS FOR REMOVING HEAD LICE

(71) Applicants: Joopi Kids Global, S.L., Mostoles, Madrid (ES); María Dolores Riazor Vilches, Madrid (ES); Francisco Javier Sanchez Crespo, Madrid (ES)

(72) Inventors: María Dolores Riazor Vilches, Madrid (ES); Francisco Javier Sanchez Crespo, Madrid (ES)

(73) Assignee: JOOPI KIDS GLOBAL, S.L., Mostoles, Madrid (ES)

( * ) Notice: Subject to any disclaimer, the term of this patent is extended or adjusted under 35 U.S.C. 154(b) by 209 days.

(21) Appl. No.: 15/754,863

(22) PCT Filed: Aug. 30, 2016

(86) PCT No.: PCT/ES2016/070615
§ 371 (c)(1),
(2) Date: Feb. 23, 2018

(87) PCT Pub. No.: WO2017/037322
PCT Pub. Date: Mar. 9, 2017

(65) Prior Publication Data
US 2018/0255901 A1     Sep. 13, 2018

(30) Foreign Application Priority Data

Aug. 31, 2015   (ES) ................ 201530976 U

(51) Int. Cl.
*A45D 20/12*     (2006.01)
*A01K 13/00*     (2006.01)
(Continued)

(52) U.S. Cl.
CPC .............. *A45D 20/12* (2013.01); *A01K 13/00* (2013.01); *A01K 13/002* (2013.01); *A01M 1/06* (2013.01);
(Continued)

(58) Field of Classification Search
CPC ..... A47L 5/14; A47L 5/32; A47L 9/08; A01G 1/125; E01H 1/0809; A45D 20/12;
(Continued)

(56) References Cited

U.S. PATENT DOCUMENTS

| | | | | |
|---|---|---|---|---|
| 5,435,327 A | * | 7/1995 | Ho ................... | A45D 24/32 119/606 |
| 6,086,682 A | * | 7/2000 | Anderson .......... | A01K 13/00 134/21 |
| 2013/0284111 A1 | * | 10/2013 | Simon ............... | A01K 13/002 119/677 |

FOREIGN PATENT DOCUMENTS

| | | | |
|---|---|---|---|
| CH | 272949 | * | 7/1948 |
| CH | 272949 A | | 1/1951 |

(Continued)

OTHER PUBLICATIONS

International Search Report for PCT/ES2016/070615.

*Primary Examiner* — Robert J Scruggs
(74) *Attorney, Agent, or Firm* — Donald J. Ranft; Collen

(57) ABSTRACT

APPARATUS FOR REMOVING HEAD LICE, designed on the basis of a base casing (2) comprising a drier (3) formed from a first electric motor (4) with an air-blowing turbine and a resistance (5), coupled to a first flexible tube (6) which comprises, on the distal end thereof, a detachable applicator head (7) with prongs (8) via which hot air is expelled. It also comprises a suction device (9) formed by a second electric motor (10) with an air suction turbine coupled to a second flexible tube (11) with a detachable suction nozzle (12), a dismountable filter (13), a very fine "nit-removing"-type comb (14), an electronic circuit (18), and at least one temperature sensor (17) which is connected to the electronic circuit (18) and determines the automatic actuation of the power-saving system on the basis of pre-established temperature parameters.

8 Claims, 2 Drawing Sheets

(51) Int. Cl.
*A45D 24/32* (2006.01)
*A45D 24/30* (2006.01)
*A01M 1/06* (2006.01)
*A01M 1/20* (2006.01)

(52) U.S. Cl.
CPC ........... *A01M 1/2094* (2013.01); *A45D 24/30* (2013.01); *A45D 24/32* (2013.01); *A45D 2200/15* (2013.01)

(58) Field of Classification Search
CPC .... A45D 24/30; A45D 24/32; A45D 2200/15; A01K 13/00; A01K 13/002; A01M 1/06; A01M 1/2094
See application file for complete search history.

(56) References Cited

FOREIGN PATENT DOCUMENTS

| | | |
|---|---|---|
| EP | 2326200 | 6/2011 |
| ES | 1094613 U | 11/2013 |

\* cited by examiner

APPARATUS FOR REMOVING HEAD LICE

OBJECT OF THE INVENTION

As expressed in the title of the present specification, the invention relates to an apparatus for removing head lice which performs the intended function with certain advantages and characteristics, to be described in detail further below, that represent an improvement on the prior art.

More specifically, the object of the invention focuses on an electrical apparatus the purpose whereof is to eliminate lice from a subject's head, and which, being of the type that operates by applying hot air through a pronged applicator associated with a drier, is characterized in that it includes a suction device that makes said elimination more effective, since, in addition to the lice, it removes the nits that remain attached to the hair, and, moreover, is designed in such a way that both elements are combined in order to optimize the use thereof and save energy.

FIELD OF APPLICATION OF THE INVENTION

The field of application of the present invention pertains to the industrial sector devoted to the manufacturing of household electrical appliances, while simultaneously focusing on items and utensils designed for the elimination of parasites, in particular head lice.

BACKGROUND OF THE INVENTION

In regards to the prior art, it is worth noting that several apparatus of the type described herein are known in the market. Thus, for example, document CH 272949A already discloses an applicator that provides an air flow and is suitable to treat animals with lice infestation, in order to substantially eliminate both the lice and the nits on the animal, and which essentially comprises a base applicator designed to be coupled to a blower, an applicator tip connected to the base applicator and a plurality of fingers on the applicator tip that act as ports to supply an air flow, since it is open on the same side, such that the applicator tip substantially supplies the entire air flow to a single input side of the applicator. Moreover, the applicator tip is dismountable. Likewise, document EP2326200 also discloses an applicator designed to distribute an air flow to treat a subject with lice infestation, which, although it presents certain improvements with respect to the preceding document, is still based on a pronged applicator that is coupled to a blower equipped with a resistance. I.e. it is a drier thanks to which the parasites become dehydrated and die.

However, although the method applied by these apparatus is effective in stopping proliferation of the parasites, it has certain aspects that are capable of being improved, since the dead lice, and especially the nits, remain attached to the hair, making it necessary to eliminate them using classic combing means to pull them from the hair.

Thus, the objective of the present invention is to develop an apparatus that provides the necessary improvements to avoid said disadvantages, which will simultaneously achieve death of the head lice and the nits, the pulling thereof and, consequently, their complete elimination; moreover, it must be noted that no other apparatus or inventions with a similar application are known, at least to the applicant, which present technical, structural and constituent characteristics similar to those of the one proposed herein, as claimed.

DESCRIPTION OF THE INVENTION

Thus, the apparatus for removing head lice proposed by the invention represents a significant novelty within its field of application, since, when implemented, the aforementioned objectives are clearly and satisfactorily achieved, the characteristic details that make it possible and distinguish it from those already known being duly recorded in the final claims that accompany the present description.

Specifically, the apparatus for removing head lice proposed by the invention consists of a base comprising a drier, formed by a blower or turbine equipped with a resistance that expels air, coupled to an applicator with a dismountable pronged tip, and, unlike other already known apparatus, further comprises a suction device formed by a second turbine, which in this case aspirates air, coupled to an applicator equipped with a dismountable tip in the form of a nozzle.

To this end, the apparatus is equipped with two separate compartments in the casing that forms the base, wherein one houses the drier, i.e. the motor plus the resistance, and the other houses the suction device.

The suction device makes it possible to clean the hair and eliminate the already dead, dehydrated head lice that still remain therein, together with the nits. To this end, said suction device comprises a "nit-removing comb", or very fine comb coupled to the applicator nozzle, which completely removes any remaining head lice or nits from the hair.

The suction device does not contain any bags designed to collect dirt; instead, the tube that connects the turbine on the base to the applicator nozzle contains a metal filter which retains the head lice and the nits. Preferably, this filter is reusable and cleanable.

Furthermore, the apparatus presents a technical advantage in terms of power saving, since it allows for the simultaneous use of both elements, such that the drier may utilize the heat generated by the suction device motor and use it for the blower, without switching on the resistance thereof; consequently, we are not using a drier, but a "blower", which utilizes the heat from the suction device motor to dehydrate the head lice, provided that both systems are used simultaneously.

This operation is controlled by an electronic circuit and software especially designed for the apparatus. By means of sensors intended for this purpose, the system detects the temperature of the suction device motor and, when it determines that it is optimal to replace the resistance of the drier, it automatically disconnects this resistance and utilizes the temperature generated in the suction device compartment as a "drier", without connecting the latter; this provides the apparatus with two advantages: on the one hand, refrigeration of the suction device motor and, on the other, power saving, by supplying heat without connecting the resistance of the drier.

Thus, the apparatus comprises sensors connected to the electronic circuit which record the temperature of the device and that of the casing containing both motors.

In any case, both motors or turbines may operate both separately and simultaneously, which reduces the implementation time for a session.

In regards to the particularities of the apparatus, also worth mentioning is the fact that the tubes that connect the motors to the applicators, both that of the drier and that of the suction device, exit through the upper part of the base casing and a handle is positioned between them such that the apparatus may be more easily moved. In turn, this handle is coupled to a support that is designed to arrange and house the tubes once the apparatus is no longer in use.

Thus, the apparatus for removing head lice described herein represents an innovation in terms of its hitherto unknown structural and constituent characteristics, which, together with its practical utility, provide it with sufficient grounds to obtain the exclusive privilege that is being applied for.

DESCRIPTION OF THE DRAWINGS

In order to supplement the description being made, and to contribute to a better understanding of the characteristics of the invention, a set of drawings is attached to the present specification as an integral part thereof, wherein the following is represented for illustrative, non-limiting purposes.

PREFERRED EMBODIMENT OF THE INVENTION

Figure 1:
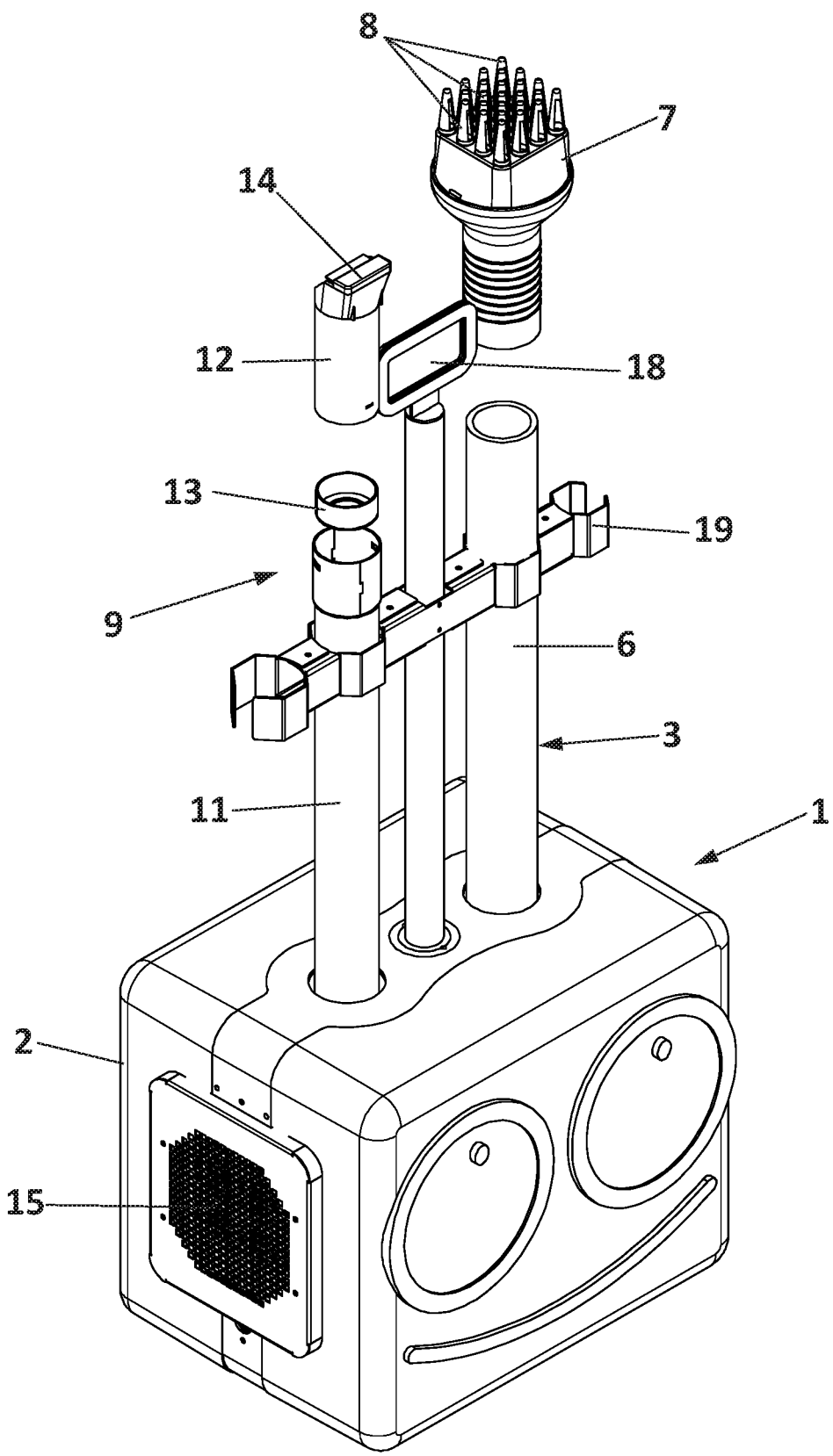
FIG. 1.—Shows a perspective view of an embodiment of the apparatus for removing head lice of the invention, which presents its general external configuration and the main parts that it comprises, the drier applicator, the suction nozzle and the filter being represented as not coupled to the respective tubes.

In light of the aforementioned figures and according to the numbering plan adopted, we may observe a non-limiting embodiment of the proposed apparatus for removing head lice, which comprises the parts and the elements specified and described in detail below.

Thus, as may observed in said figures, the apparatus (1) in question is designed on the basis of a base casing (2) that comprises:
- a drier (3) formed by a first electric motor (4) with an air-blowing turbine and a resistance (5), coupled to a first flexible tube (6) which comprises, on the distal end thereof, a detachable applicator head (7) with prongs (8) through which the hot air is expelled.
- a suction device (9) formed by a second electric motor (10) with an air suction turbine coupled to a second flexible tube (11) comprising an also detachable suction nozzle (12) on the distal end thereof.

Preferably, in order to retain and collect the head lice and the nits aspirated, the suction device (9) comprises a filter (13) coupled to the flexible tube (11), such that it is easily dismountable, and which is preferably metallic and, therefore, reusable and cleanable.

Moreover, also preferably, the suction device (9) nozzle (12) comprises a very fine "nit-removing"-type comb (14) that is coupled thereto as an accessory, detachable element.

Figure 2:
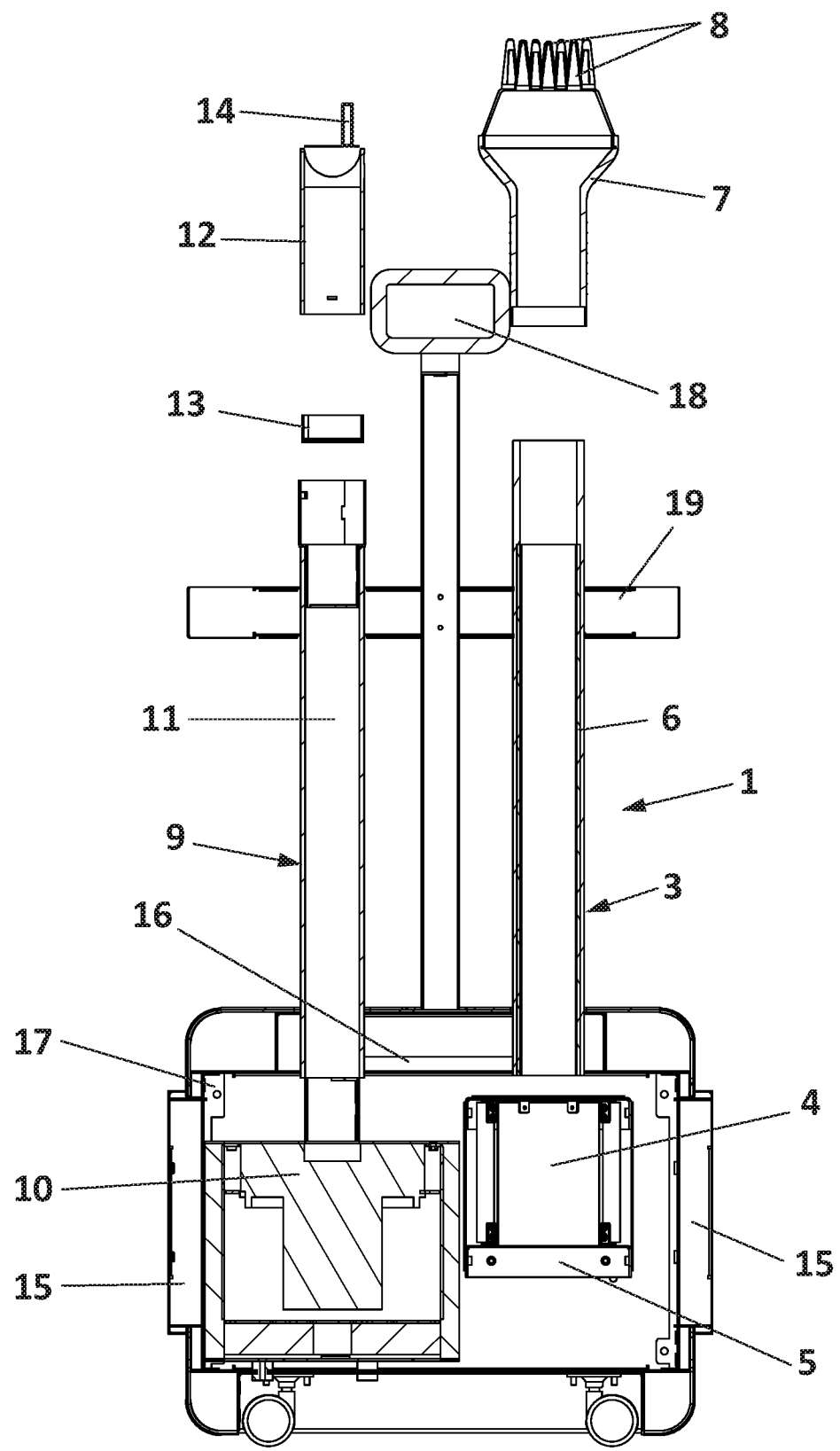
FIG. 2.—Shows a sectional view of the embodiment of the apparatus according to the invention of FIG. 1, which presents the parts and the elements that it comprises and internally incorporates, as well as the configuration and arrangement thereof. Also in this case, the drier applicator and the suction nozzle, as well as the filter, are represented as not coupled to the respective tubes.

As may be observed in FIG. 2, the first motor (4), which comprises an air-blowing turbine and the resistance (5) of the drier (3), is housed in a compartment separate from the compartment that houses the second motor (10), which comprises an air suction turbine of the suction device (9), air being allowed to pass between both housings, and also having ventilation grilles (15) on the sides of the casing (2). In any case, said motors are connected to one another by means of the corresponding cables and electronic circuit (16), such that both motors (4 and 10) may operate both separately and simultaneously.

Moreover, the electronic circuit (16) comprises control software or electronics especially designed to operate with a power-saving system, which makes it possible to actuate both motors (4, 10) at the same time and utilize the heat generated by the suction device (9) motor (10) to heat the air expelled by the drier (3), thereby replacing the action of the resistance (5). And, in order to optimize said power-saving system, one or more temperature sensors (17) are connected to said circuit, which, on the basis of pre-established temperature parameters, determine the automatic actuation of said power-saving system.

Finally, the casing (2) is equipped with a handle (18) arranged between the flexible tubes (6 and 11) of the drier (3) and the suction device (9), which is coupled to a support (19) equipped with holding means for positioning said tubes.

Having sufficiently described the nature of the present invention, as well as the way to implement it, it is not deemed necessary to expand on the description such that persons skilled in the art may understand the scope thereof and the advantages derived therefrom, and we state that, within its essentiality, it may be implemented in other embodiments that may differ in some details from the one described as an example, and which will equally receive the protection being requested, provided that they do not alter, change or modify the fundamental principle thereof.

The invention claimed is:

1. APPARATUS FOR REMOVING HEAD LICE, designed on the basis of a base casing (2), comprising a drier (3) formed by a first electric motor (4) with an air-blowing turbine and a resistance (5), coupled to a first flexible tube (6) which comprises, on the distal end thereof, a detachable applicator head (7) with prongs (8) through which hot air is expelled, characterized in that it further comprises a suction device (9) formed by a second electric motor (10) with an air suction turbine, coupled to a second flexible tube (11) with a suction nozzle (12) on the distal end thereof, and an electronic circuit (16) that comprises control software or electronics suitable to actuate a power-saving system, wherein both motors (4, 10) may operate simultaneously and utilize the heat generated by the suction device (9) motor (10) to heat the air expelled by the drier (3), thereby replacing the action of the resistance (5), and including one or more temperature sensors (17) connected to the circuit which, on the basis of pre-established temperature parameters, determine the automatic actuation of the power-saving system.

2. APPARATUS FOR REMOVING HEAD LICE according to claim 1, wherein the nozzle (12) on the distal end of the flexible tube (11) of the suction device (9) is detachable.

3. APPARATUS FOR REMOVING HEAD LICE according to any of claims 1 and 2, wherein, in order to retain and collect the head lice and nits aspirated, the suction device (9) comprises a filter (13) coupled to the flexible tube (11).

4. APPARATUS FOR REMOVING HEAD LICE according to claim 3, wherein the suction device (9) filter (13) is dismountable.

5. APPARATUS FOR REMOVING HEAD LICE according to claim 4, wherein the suction device (9) filter (13) is reusable and cleanable.

6. APPARATUS FOR REMOVING HEAD LICE according to any of claims 1 to 5, wherein the suction device (9) nozzle (12) comprises a very fine "nit-removing"-type comb (14).

7. APPARATUS FOR REMOVING HEAD LICE according to claim 6, wherein the comb (14) is coupled to a nozzle (12) as an accessory, detachable element.

8. APPARATUS FOR REMOVING HEAD LICE according to any of claims 1 to 7, wherein the casing (2) is equipped with a handle (18) arranged between the flexible tubes (6 and 11) of the drier (3) and the suction device (9), which is coupled to a support (19) with holding means for positioning said tubes.

\* \* \* \* \*